US011273857B2

(12) United States Patent
Knepp et al.

(10) Patent No.: US 11,273,857 B2
(45) Date of Patent: Mar. 15, 2022

(54) TUGGER CART ASSEMBLY

(71) Applicant: J-Tec Industries, Inc., East Peoria, IL (US)

(72) Inventors: Joseph Wayne Knepp, East Peoria, IL (US); Ryan Merritt, East Peoria, IL (US); Christopher Jacob Camp, East Peoria, IL (US)

(73) Assignee: J-TEC INDUSTRIES, INC., East Peoria, IL (US)

( * ) Notice: Subject to any disclaimer, the term of this patent is extended or adjusted under 35 U.S.C. 154(b) by 152 days.

(21) Appl. No.: 16/811,715

(22) Filed: Mar. 6, 2020

(65) Prior Publication Data
US 2021/0276603 A1    Sep. 9, 2021

(51) Int. Cl.
| *B62B 3/00* | (2006.01) |
| *B62B 3/06* | (2006.01) |
| *B62B 5/00* | (2006.01) |
| *B62B 5/04* | (2006.01) |

(52) U.S. Cl.
CPC .............. *B62B 3/06* (2013.01); *B62B 5/0079* (2013.01); *B62B 5/04* (2013.01); *B62B 2202/90* (2013.01); *B62B 2207/02* (2013.01)

(58) Field of Classification Search
CPC ........... B62B 3/06; B62B 3/04; B62B 3/1404; B62B 3/00; B62B 3/02; B62B 3/14; B62B 3/1476; B62B 5/04; B62B 5/0079; B62B 5/0083; B62B 2202/90; B62B 2202/92; B62B 2207/00; B62B 2207/02; B62B 2207/04
See application file for complete search history.

(56) References Cited

U.S. PATENT DOCUMENTS

| 4,076,137 | A | * | 2/1978 | Kucera | ................. A01D 90/083 414/24.5 |
| 4,515,518 | A | * | 5/1985 | Gilbert | .................. B60P 1/6445 280/43.23 |
| 6,431,319 | B1 | * | 8/2002 | Myers | ....................... B62B 3/02 187/243 |
| 6,866,463 | B2 | * | 3/2005 | Riordan | .................... B62B 3/04 280/79.3 |
| 7,004,489 | B2 | | 2/2006 | Brown | |
| 7,416,196 | B2 | | 8/2008 | Brown | |
| 7,497,448 | B2 | | 3/2009 | Brown | |

(Continued)

*Primary Examiner* — James M Dolak
(74) *Attorney, Agent, or Firm* — Kilyk & Bowersox, P.L.L.C.

(57) ABSTRACT

A tugger cart includes a tugger frame having a first side member, a second side member, and a locking member disposed in between the first side member and the second side member. A first roller assembly is coupled to an inner surface of the first side member and a second roller assembly coupled to an inner surface of the second side member. Each of the first roller assembly and the second roller assembly include a roller assembly frame and a plurality of wheels rotatably coupled to the roller assembly frame. The roller assembly frame supports the plurality of wheels at a slant that declines from a rear of the tugger frame to a front of the tugger frame. An actuator is configured to raise and lower the first roller assembly and the second roller assembly relative to the first side member and the second side member respectively.

14 Claims, 3 Drawing Sheets

(56) References Cited

U.S. PATENT DOCUMENTS

| | | | |
|---|---|---|---|
| 7,806,646 B2* | 10/2010 | Riordan | B62B 3/04 |
| | | | 414/498 |
| 7,866,933 B2* | 1/2011 | Welch | B60P 1/6445 |
| | | | 414/458 |
| 8,302,975 B2* | 11/2012 | Hergeth | B62D 53/005 |
| | | | 280/47.19 |
| 9,008,825 B2 | 4/2015 | Benjamin et al. | |
| 9,211,900 B2* | 12/2015 | Knepp | B62B 3/08 |
| 9,238,553 B2 | 1/2016 | Chamberlain | |
| 9,290,214 B2 | 3/2016 | Badura et al. | |
| 9,676,314 B2 | 6/2017 | Neubauer | |
| 9,688,180 B2 | 6/2017 | Ziemann et al. | |
| 9,738,299 B2 | 8/2017 | Ard et al. | |
| 9,738,465 B2* | 8/2017 | Berghammer | B60P 1/02 |
| 9,862,435 B2* | 1/2018 | Scarth | B62D 53/04 |
| 10,052,995 B2 | 8/2018 | Berghammer | |
| 10,093,334 B1 | 10/2018 | Brown et al. | |
| 10,150,522 B2* | 12/2018 | Scarth | B62D 63/08 |
| 10,377,434 B2 | 8/2019 | Berghammer | |
| 11,014,593 B2* | 5/2021 | Knepp | B62B 5/04 |
| 11,186,327 B2* | 11/2021 | Scarth | B62D 63/06 |
| 2019/0225285 A1 | 7/2019 | Packeiser et al. | |
| 2020/0001907 A1* | 1/2020 | Scarth | B62B 5/00 |

\* cited by examiner

TUGGER CART ASSEMBLY

BACKGROUND OF THE INVENTION

The present invention relates to tugger carts and, more particularly, to a tugger cart with an automated lift system.

In the world of intra-plant material handling, a common approach to conveying material from one location to another is called a tugger/pushcart system. The system consists of three components: a tugger truck, tugger cart, and pushcart. The tugger truck pulls a train of tugger carts, with push carts on board, from location to location in a factory or warehouse. For example, the push carts are loaded with material at a picking station or supermarket. They are then loaded on to the tugger carts. After that, they are tugged to the unload area, unloaded off of the tugger carts, and pushed into their final position on the assembly line. At this point, the empty tugger carts may be reloaded with empty push carts and returned to the picking station.

When loading a rider cart with a heavy load onto an inclined plane of a tugger cart, the force is very great—above many company's ergonomic requirements for hand loading or pushing a cart. Current systems rely on an operator to manually push to load a cart into a tugger system, and also to exert effort to pull the cart back out of the tugger system. This decreases workplace safety and increases the risk of injury or fatigue. Humans can only exert so much force safely. In order to load and unload a cart from an all-mechanical system with no electric or gravity assist, much force is required by a human operator to engage the rider cart with the tugger cart system.

As can be seen, there is a need for an improved tugger cart with an automated lift system.

SUMMARY OF THE INVENTION

In one aspect of the present invention, an apparatus comprising: a tugger cart comprising: a tugger frame comprising a first side member, a second side member, and a locking member disposed in between the first side member and the second side member; a plurality of casters coupled to a bottom of the tugger frame; a first roller assembly coupled to an inner surface of the first side member and a second roller assembly coupled to an inner surface of the second side member, wherein each of the first roller assembly and the second roller assembly comprise a roller assembly frame and a plurality of wheels rotatably coupled to the roller assembly frame, wherein the roller assembly frame supports the plurality of wheels at a slant that declines from a rear of the tugger frame to a front of the tugger frame; and an actuator configured to raise and lower the first roller assembly and the second roller assembly relative to the first side member and the second side member respectively, wherein the locking member is configured to releasably secure a rider cart to the tugger frame when the rider cart is rolled over the locking member.

In another aspect of the present invention, a tugger cart comprising: a tugger frame comprising a first side member, a second side member, and a locking member; a plurality of wheels coupled to a bottom of the tugger frame; a first roller assembly coupled to an inner surface of the first side member by a first front pivoting arm coupled to a front end of the first roller assembly and pivotably coupled to the tugger frame at a first front pivot point, and a first rear pivoting arm coupled to a rear end of the first roller assembly and pivotably coupled to the tugger frame at a first rear pivot point and a second roller assembly coupled to an inner surface of the second side member by a second front pivoting arm coupled to a front end of the second roller assembly and pivotably coupled to the tugger frame at a second front pivot point, and a second rear pivoting arm coupled to a rear end of the second roller assembly and pivotably coupled to the tugger frame at a second rear pivot point, wherein each of the first roller assembly and the second roller assembly comprise a roller assembly frame and a plurality of wheels rotatably coupled to the roller assembly frame, wherein the roller assembly frame supports the plurality of wheels at a slant that declines from a rear of the tugger frame to a front of the tugger frame; at least one actuator comprising an actuator rod configured to extend and retract horizontally when the at least one actuator is activated and at least one rocker arm pivotably coupled to the actuator rod and pivotably coupled to the first rear pivoting arm and the second rear pivoting arm, wherein the locking member is configured to releasably secure a rider cart to the tugger frame when the rider cart is rolled over the locking member, and when the at least one actuator is activated by an activation button to extend, the actuator rod extends in a horizontal direction, which pivots the first and second front pivoting rod and the first and second rear pivoting rod in a first direction, pushing the roller assembly in an upward direction and when the at least one actuator is activated by the activation button to retract, the actuator rod retracts back into the at least one actuator in the horizontal direction, which pivots the first and second front pivoting rod and the first and second rear pivoting rod in an opposite direction, lowering the roller assembly in a downward direction.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an electric-lift and gravity-offload tugger cart. The electric-powered tugger cart of the present invention allows an operator to push the loaded cart with minimal effort straight into the tugger cart while the rider cart remains in contact with the ground, not going up an inclined plane. The electric lift mother cart engages the mechanical safety-catch pins, and electric actuators lift the rider cart up off of the ground into transport position. This greatly reduces the ergonomic effort from the operator. The electric lift tugger cart of the present invention allows easy loading of a loaded rider cart, and with the built-in angle of the cam roller wheels, allows a gravity-assist unload.

Figure 1:
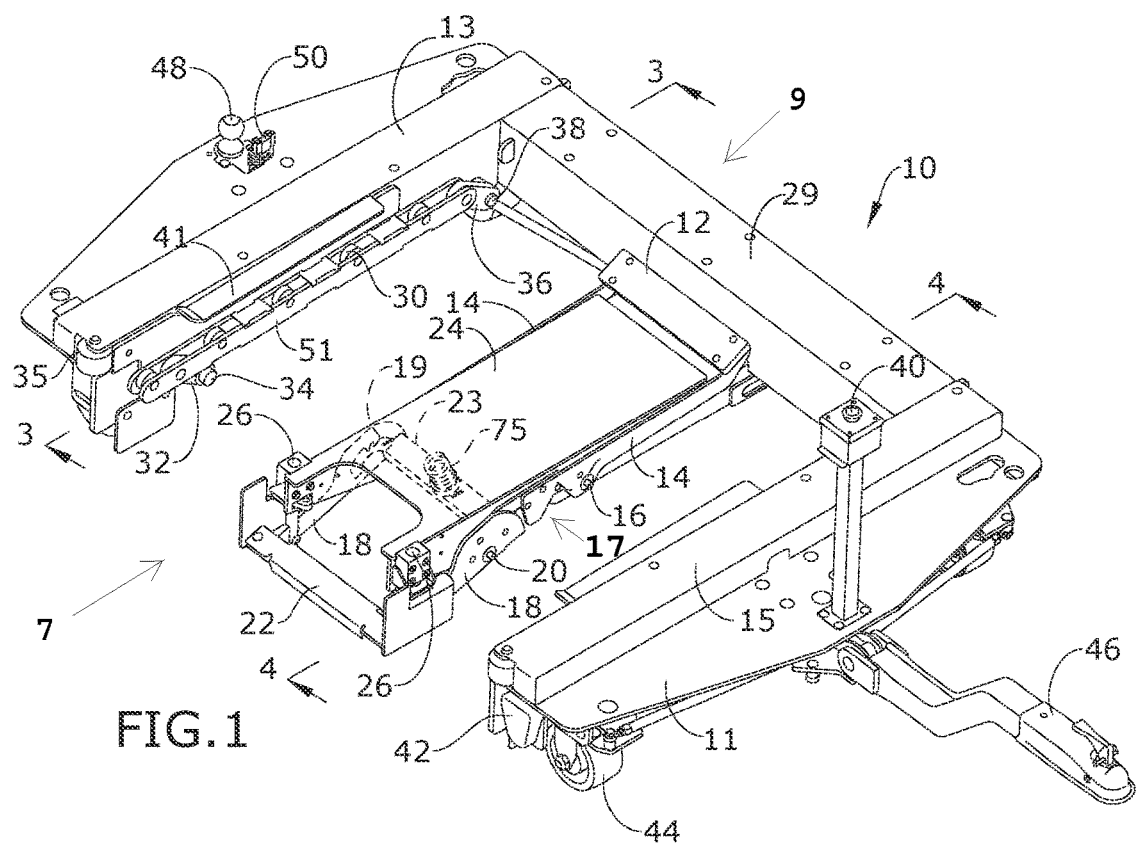
FIG. 1 is a perspective view of an embodiment of the present invention.
Figure 2:
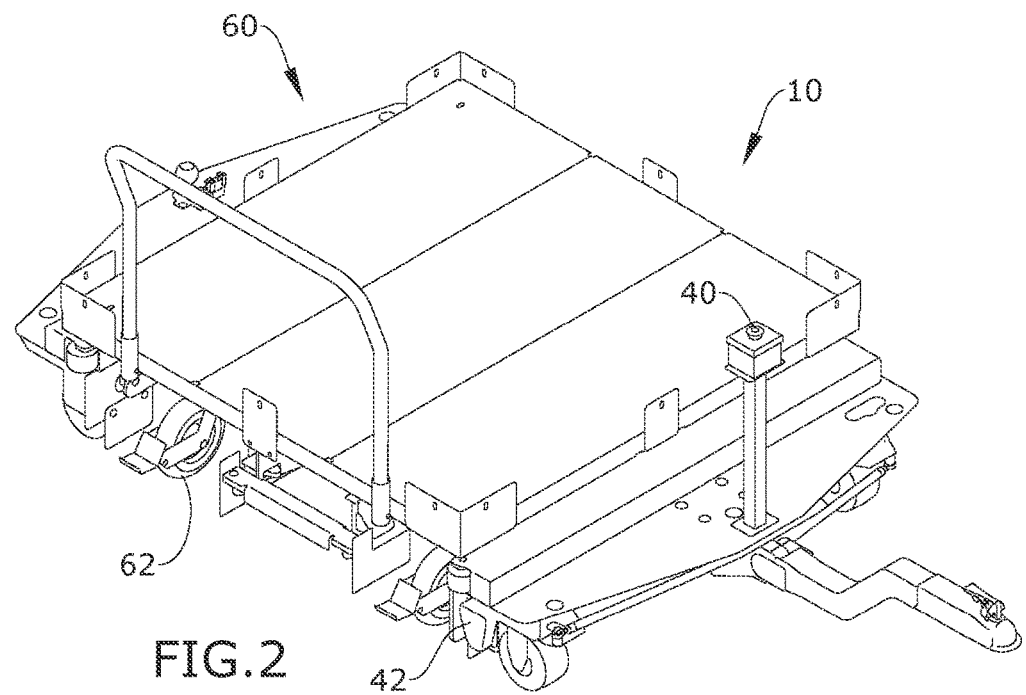
FIG. 2 is a perspective view of an embodiment of the present invention, illustrating a rider cart loaded.
Figure 3:
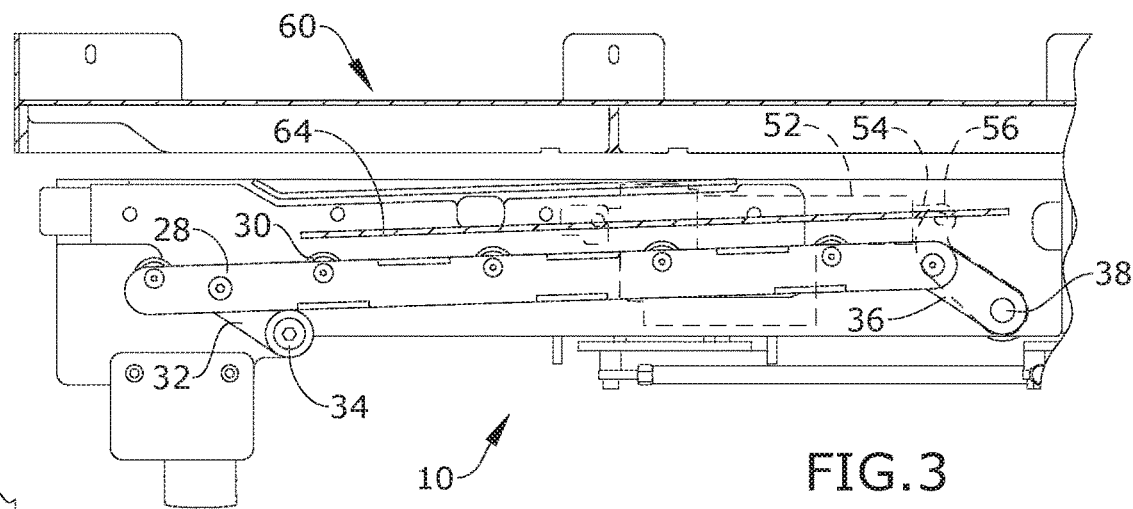
FIG. 3 is a section view of the present invention, taken along line 3-3 in FIG. 1.
Figure 4:
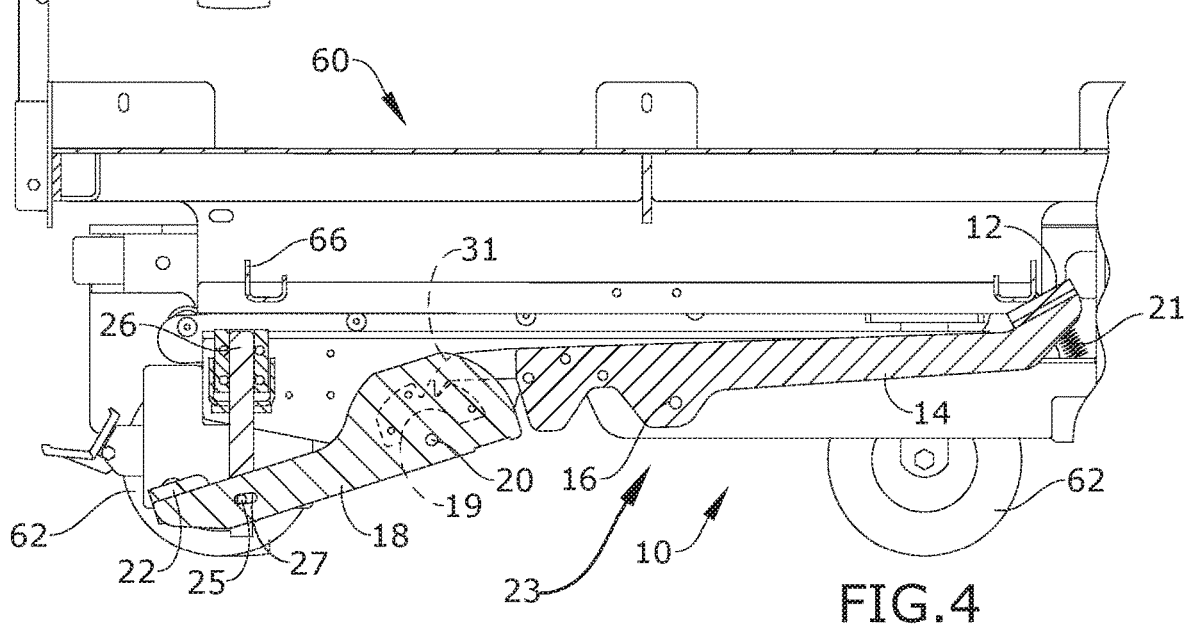
FIG. 4 is a section view of the present invention, taken along line 4-4 in FIG. 1.
Figure 5:
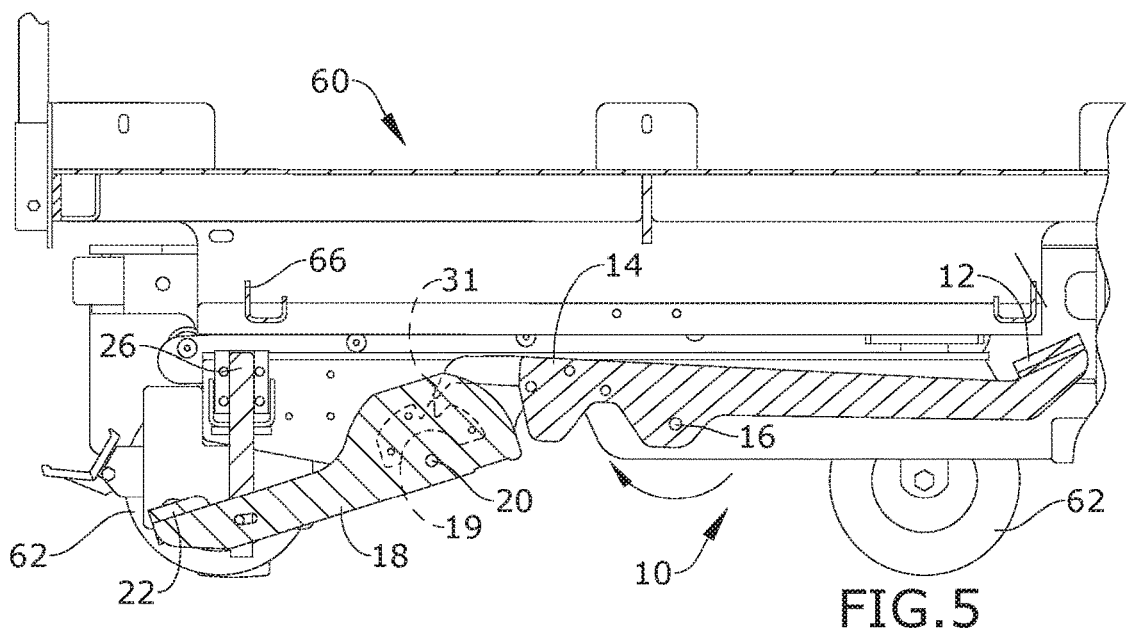
FIG. 5 is a section view of an embodiment of the present invention, illustrating a transition to an unlocked position.
Figure 6:
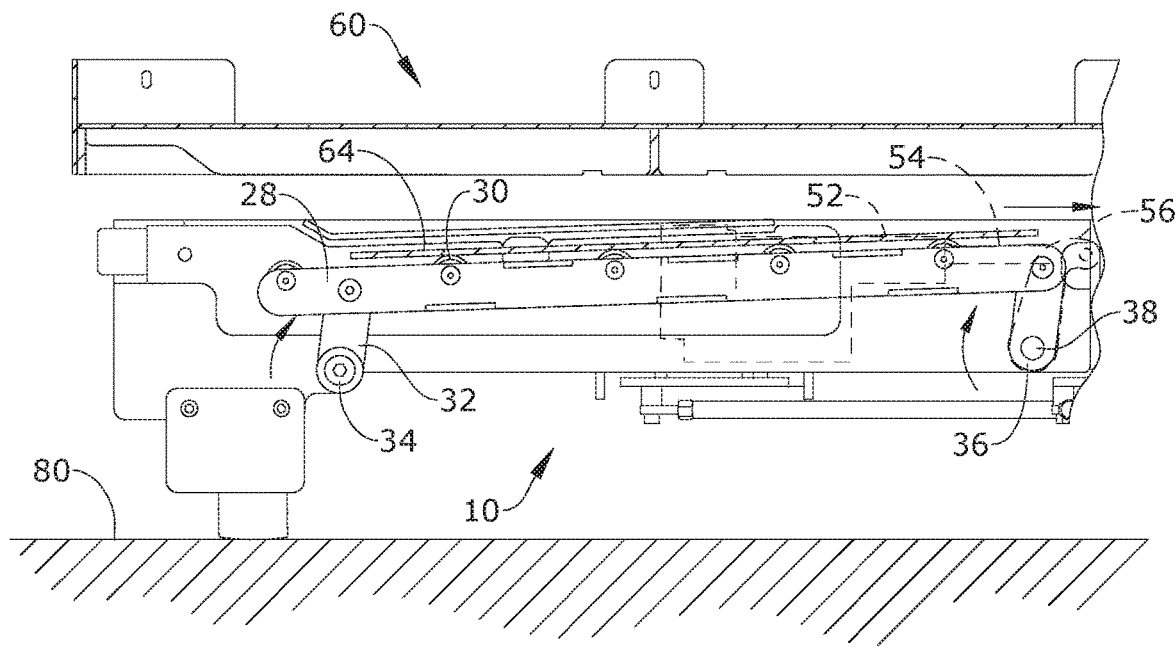
FIG. 6 is a section view of an embodiment of the present invention, illustrating rotation of a rocker arm to raise a roller assembly.
Figure 7:
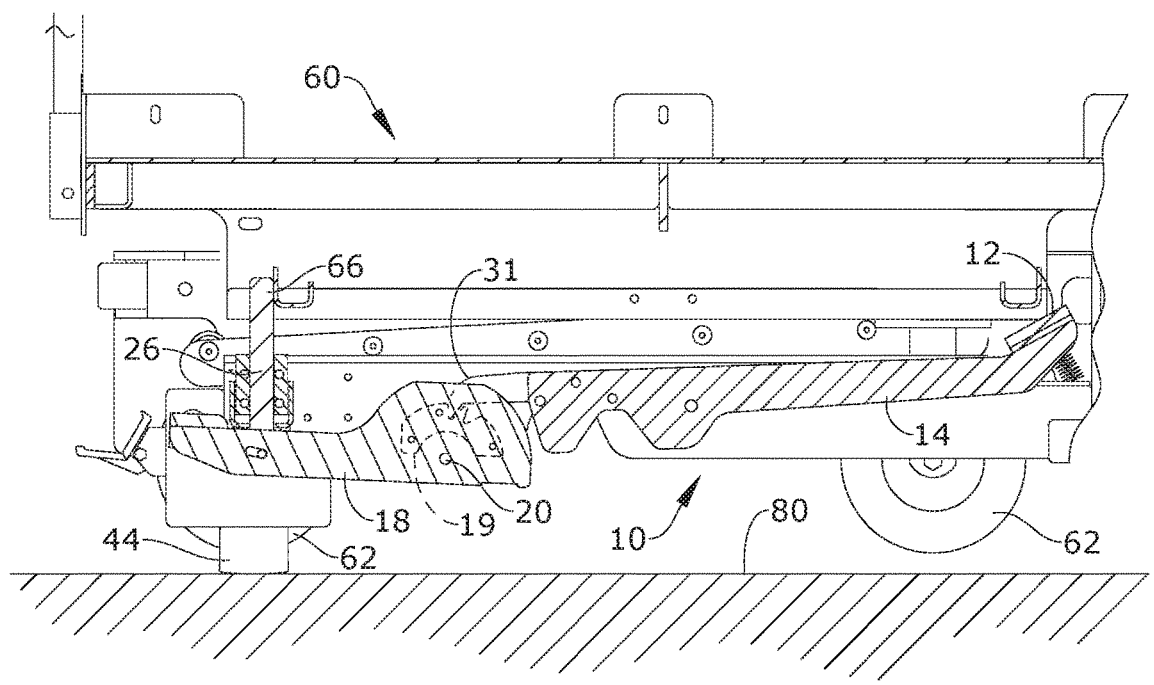
FIG. 7 is a section view of an embodiment of the present invention, illustrating a cart in a loaded and locked position.

Referring to FIGS. 1 through 7, the present invention may include a tugger cart 10. The tugger cart 10 includes a tugger frame 11. The tugger frame 11 may include a first side member 13, a second side member 15, a locking member 24, and a transverse member 29. The locking member 24 may be disposed in between the first side member 13 and the second side member 15. The first side member 13, the locking member 24, and the second side member 15 may be joined together at a rear end of the tugger frame 11 by the transverse member 29. Channels may be defined between the first side member 13, the locking member 24, and the second side member. A plurality of wheels 44, such as casters, may be attached to a bottom of the tugger frame 11.

In certain embodiments, the locking member 24 includes a latch mechanism 17. The latch mechanism 17 may include at least one rocking arm 23 pivotally attached to the tugger frame 11 at a pivot point. The at least one rocking arm 23 may include a lock pedal 12 near the rear 9 of the tugger frame 11 and an unlock pedal 22 near the front 7 of the tugger frame 11. At least one locking peg 26 may be coupled to the at least one rocking arm 23 and may protrude upwards. The lock pedal 12 may be biased in an upward position by a spring 21 and the unlock pedal 22 may be biased in a downward position. When the lock pedal 12 is forced downward, the unlock pedal 22 and the at least one locking peg 26 are forced upward. The at least one locking peg 26 may include two locking pegs 26.

In certain embodiments, the at least one rocking arm 23 may include a rear arm 14 pivotally attached to the locking member 24 at a first pivot point 16, and a front arm 18 pivotally attached to the locking member 24 at a second pivot point 20. In such embodiments, the lock pedal 12 may be attached to the rear arm 14 and the unlock pedal 22 may be attached to the front arm 18. The at least one locking peg 26 may also be attached to the front arm 18 near the unlock pedal 22. The rear arm 14 may include a locking tip 31 and the front arm 18 may include a curved engagement 19 comprising a first notch for the lock position and a second notch for the unlocked position. When the locking tip 31 is disposed in the first notch, the locking member 24 is in the locked position with the locking pegs in the upwards position. When the locking tip 31 is disposed in the second notch, the locking member 24 is in the unlocked position with the locking pegs 26 in a downwards position.

In certain embodiments, the lock pedal 12 of the rear arm 14 may be spring biased upwards by a rear spring 21 and the unlock pedal 22 of the front arm 18 may be spring biased upwards by a front spring 75. In such embodiments, when the rear arm 14 and the front arm 18 are interlocked in the second notch, the unlock pedal 22 and the at least one locking peg 26 are forced downward in an unlocked position. Therefore, the unlock pedal 22 is temporarily biased in the downward position due to the force applied by the rear arm 14. When pressure is applied to the lock pedal 12, the rear arm 14 and the front arm 18 are shifted and interlocked in the first notch and the unlock pedal 22 and the at least one locking peg 26 are released upward. In certain embodiments, a post pivot pin 25 may connect the lock pedal pegs 26 to the front arm 18 and may shift within a front arm pivot slot 27 when the lock pedal pegs 26 are pivoted from the unlocked position to the locked position.

A first roller assembly 28 is coupled to an inner side of the first side member 13 and a second roller assembly 28 is coupled to an inner side of the second side member 15. Each of the first and second roller assemblies 28 include a roller assembly frame 51 and a plurality of wheels 30 coupled to the roller assembly frame 51. The plurality of wheels 30 rotate about a horizontal axis. The roller assembly frame 51 supports the plurality of wheels 30 along a common plane. The common plane is disposed at an angle relative to the horizontal. The angle of the common plane disposed the plurality of wheels 30 at a slant that declines from the rear of the tugger frame 11 to the front of the tugger frame 11. An actuator 52 is coupled to each of the roller assemblies 28 and is capable of lifting the roller assemblies 28 upward and downward relative to a remainder of the tugger frame 11.

In certain embodiments, each of the roller assemblies 28 are coupled to the tugger frame 11 by a front pivoting arm 32 and a rear pivoting arm 36. The front pivoting arm 32 is coupled to a front end of the roller assembly 28 and pivotably coupled to the tugger frame 11 at a front pivot point 34. The rear pivoting arm 36 is coupled to a rear end of the roller assembly 28 and pivotably coupled to the tugger frame 11 at a rear pivot point 38. The actuator 52 may include an actuator rod 54. A rocker arm 56 may be pivotably coupled to the actuator rod 54 and pivotably coupled to the rear pivoting arm 36. When the actuator 52 is activated by an activation button 42 to extend, the actuator rod 54 extends in a horizontal direction, which pivots the front pivoting arm 32 and the rear pivoting arm 26 in a first direction, pushing the roller assembly 28 in an upward direction. When the actuator 52 is activated by the activation button 42 to retract, the actuator rod 54 retracts back into the actuator 52 in the horizontal direction, which pivots the front pivoting arm 32 and the rear pivoting arm 36 in the opposite direction, lowering the roller assembly 28 in a downward direction.

The present invention may further include guide wheels 35 near the front end of the first side member 13 and the second side member 15. The guide wheels 35 may rotate about a vertical axis and may guide the rider carts 60 over top of the roller assemblies 28. In certain embodiments, anti-tip wings 41 may be attached to the inner sides of the first side member 13 and the second side member 15 above the roller assemblies 28. The anti-tip wings 41 may be substantially parallel to the slanted angle of the roller assemblies 28. The anti-tip wings 41 may prevent the rider cart 60 from tipping off of the tugger cart 10.

In certain embodiments, the present invention may include a plurality of tugger carts 10, such as a first tugger cart 10 and a second tugger cart 10. The first tugger cart 10 and the second tugger cart 10 may be releasably attachable. For example, the tugger cart 10 may include a rim protruding from the first side member 13 and the second side member 15. The rim may include a top surface. At least one hitch ball 48 and a cable connection 50 may be attached to a top surface of one of the rims. The other of the rims may include a hitch receiver 46. The hitch receiver 46 of one cart 10 may connect to the hitch ball 48 of another cart 10.

The rider cart 60 may be loaded and unloaded onto the tugger cart 10. The rider cart 60 may include a rider frame 66 having a front end, a rear end, a first side, a second side, a top and a bottom. A plurality of wheels 62 may be attached to the bottom. A platform may be coupled to the rider frame 66. Angled rider cart flanges 64 may extend laterally from the rider frame beneath the platform.

As illustrated in FIGS. 3 through 7, the rider carts 60 may be pushed and locked onto the tugger carts 10. The rider cart 60 may be mounted onto the tugger cart 10 in a locked position and dismounted from the tugger cart 10 in an unlocked position. The rider cart 60 is pushed into the tugger cart 10 such that the wheels 62 roll within the channels of the frame 11. The rider cart frame 66 applies a force against the lock pedal 12. The lock pedal 12 may pivot along pivot point 16. The locking tip 31 of the rear arm 14 is lifted out of the second notch and the front arm 18 may pivot upward along pivot point 20. The front arm 18 pivots upward so that the unlock pedal 22 and the peg 26 shift upward. The peg 26 locks the rider cart 60 to the tugger cart 10 in the locked position. The locking tip 31 rests within the first notch. The activation button 42 is then engaged, and the roller assemblies lift the rider cart 60 upwards so that the wheels 62 of the rider cart 60 are in an elevated position relative to a surface 80 that the tugger cart 10 is resting. The rider cart 60 may now be transported. To remove the rider cart 60 from the tugger cart 10, a user may push down on the unlock pedal 22 downwards so that the peg 26 is no longer blocking the rider cart 60. The rider cart 60 may then roll along the wheels 30 of the roller assembly 28 due to the slant and gravity. The rider cart 60 thereby rolls off the tugger cart 10 on its own.

It should be understood, of course, that the foregoing relates to exemplary embodiments of the invention and that modifications may be made without departing from the spirit and scope of the invention as set forth in the following claims.

What is claimed is:

1. An apparatus comprising:
a tugger cart comprising:
a tugger frame comprising a first side member, a second side member, and a locking member disposed in between the first side member and the second side member;
a plurality of wheels coupled to a bottom of the tugger frame;
a first roller assembly coupled to an inner surface of the first side member and moveable in a vertical direction relative to the first side member, a second roller assembly coupled to an inner surface of the second side member and moveable in the vertical direction relative to the second side member, wherein each of the first roller assembly and the second roller assembly comprise a respective roller assembly frame and a respective plurality of wheels rotatably coupled to the respective roller assembly frame, wherein the respective roller assembly frame supports the respective plurality of wheels such that at least a portion of each of the respective plurality of wheels extends above the respective roller assembly frame and the portion of each of the respective plurality of wheels is disposed along a slant that declines from a rear of the tugger frame to a front of the tugger frame; and
an actuator that raises upon a first activation and lowers upon a second activation the first roller assembly and the second roller assembly relative to the first side member and the second side member, respectively, wherein the locking member releasably secures a rider cart to the tugger frame when the rider cart is rolled over the locking member.

2. The apparatus of claim 1, wherein the locking member comprises a latch mechanism comprising at least one rocking arm pivotally attached at a pivot point, wherein the at least one rocking arm comprises a lock pedal near the rear of the tugger frame, an unlock pedal near the front of the tugger frame, and at least one locking peg protruding upwards from the at least one rocking arm, wherein the lock pedal is biased in an upward position, and, when the lock pedal is forced downward, the unlock pedal and the at least one locking peg moves upward.

3. The apparatus of claim 2, wherein the at least one rocking arm comprises a rear arm pivotally attached to the locking member at a first pivot point and a front arm pivotally attached to the locking member at a second pivot point, wherein the rear arm comprises the lock pedal and the front arm comprises the unlock pedal and the at least one locking peg, wherein the rear arm and the front arm interlock at a first notch and a second notch.

4. The apparatus of claim 3, wherein the lock pedal of the rear arm is spring biased upwards and the unlock pedal of the front arm is spring biased upwards, wherein when the rear arm and the front arm are interlocked in the second notch, the unlock pedal and the at least one locking peg are forced downward, wherein when pressure is applied to the lock pedal, the rear arm and the front arm are interlocked in the first notch and the unlock pedal and the at least one locking peg are released upward.

5. The apparatus of claim 4, further comprising the rider cart, the rider cart comprising:
a rider frame;
a plurality of wheels coupled to the rider frame; and
angled rider cart flanges extending laterally from the rider frame.

6. The apparatus of claim 5, wherein the rider cart is mounted onto the tugger cart in a locked position and dismounted from the tugger cart in an unlocked position, the rider frame applying force against the lock pedal such that the at least one locking peg protrudes upwards blocking the rider cart from rolling off of the tugger cart in the locked position, wherein, in the unlocked position, force is applied to the unlock pedal to force the at least one locking peg downwards and thereby enable the rider cart to dismount from the tugger cart.

7. The apparatus of claim 5, wherein, when the actuator is activated, the first roller assembly and the second roller assembly engage the angled rider cart flanges and raise the rider cart to an elevated position relative to a surface the tugger frame is resting on.

8. The apparatus of claim 1, wherein each of the first roller assembly and the second roller assembly is coupled to the tugger frame by a respective front pivoting arm and a respective rear pivoting arm.

9. The apparatus of claim 8, wherein the respective front pivoting arms are coupled to a front end of the first roller assembly and to a front end of the second roller assembly, the respective front pivoting arms pivotably coupled to the tugger frame at respective front pivot points, and the respective rear pivoting arms are coupled to a rear end of the first roller assembly and to a rear end of the second roller assembly, the respective rear pivoting arms pivotably coupled to the tugger frame at respective rear pivot points.

10. The apparatus of claim 9, wherein the actuator comprises an actuator rod that extends and retracts horizontally when the actuator is activated.

11. The apparatus of claim 10, further comprising a rocker arm pivotably coupled to the actuator rod and pivotably coupled to at least one of the respective rear pivoting arms.

12. The apparatus of claim 11, wherein, when the actuator is activated by an activation button to extend, the actuator rod extends in a horizontal direction, which pivots the respective front pivoting arms and the respective rear pivoting arms in a first direction, pushing the first roller assembly and the second roller assembly in an upward direction, and, when the actuator is activated by the activation button to retract, the actuator rod retracts back into the actuator in the horizontal direction, which pivots the respective front pivoting arms and the respective rear pivoting arms in the opposite direction, lowering the first roller assembly and the second roller assembly in a downward direction.

13. A tugger cart comprising:
   a tugger frame comprising a first side member, a second side member, and a locking member;
   a plurality of wheels coupled to a bottom of the tugger frame;
   a first roller assembly coupled to an inner surface of the first side member by a first front pivoting arm coupled to a front end of the first roller assembly and pivotably coupled to the tugger frame at a first front pivot point, and a first rear pivoting arm coupled to a rear end of the first roller assembly and pivotably coupled to the tugger frame at a first rear pivot point;
   a second roller assembly coupled to an inner surface of the second side member by a second front pivoting arm coupled to a front end of the second roller assembly and pivotably coupled to the tugger frame at a second front pivot point, and a second rear pivoting arm coupled to a rear end of the second roller assembly and pivotably coupled to the tugger frame at a second rear pivot point, wherein each of the first roller assembly and the second roller assembly comprises a respective roller assembly frame and a respective plurality of wheels rotatably coupled to the respective roller assembly frame, wherein the respective roller assembly frame supports the respective plurality of wheels at a slant that declines from a rear of the tugger frame to a front of the tugger frame;
   at least one actuator comprising an actuator rod; and
   at least one rocker arm pivotably coupled to the actuator rod and pivotably coupled to at least one of the first rear pivoting arm and the second rear pivoting arm, wherein
   the locking member releasably secures a rider cart to the tugger frame when the rider cart is rolled over the locking member, and
   when the at least one actuator is activated to extend, the actuator rod extends in a horizontal direction, which pivots the first and second front pivoting rod and the first and second rear pivoting rod in a first direction, pushing the first roller assembly and the second roller assembly in an upward direction, and, when the at least one actuator is activated to retract, the actuator rod retracts back into the at least one actuator in the horizontal direction, which pivots the first and second front pivoting rod and the first and second rear pivoting rod to lower the first roller assembly and the second roller assembly in a downward direction.

14. The apparatus of claim 13, further comprising the rider cart comprising:
   a rider frame;
   a plurality of wheels coupled to the rider frame; and
   angled rider cart flanges extending laterally from the rider frame.

* * * * *

UNITED STATES PATENT AND TRADEMARK OFFICE
CERTIFICATE OF CORRECTION

PATENT NO. : 11,273,857 B2  
APPLICATION NO. : 16/811715  
DATED : March 15, 2022  
INVENTOR(S) : Knepp et al.

Page 1 of 1

It is certified that error appears in the above-identified patent and that said Letters Patent is hereby corrected as shown below:

On the Title Page

Change Applicant name from "J-Tec Industries, Inc." to --Jtec Industries, Inc.--.
Change Assignee name from "J-TEC INDUSTRIES, INC." to --Jtec Industries, Inc.--.

Signed and Sealed this
Twenty-sixth Day of August, 2025

Coke Morgan Stewart
*Acting Director of the United States Patent and Trademark Office*